Nov. 6, 1945.   CARL-ERIK GRANQVIST   2,388,263
RADIO DIRECTION FINDING SYSTEM
Filed June 30, 1942

INVENTOR.
Carl-Erik Granqvist
BY
James C. Marble
his ATTORNEY

UNITED STATES PATENT OFFICE 2,388,263

RADIO DIRECTION FINDING SYSTEM

Carl-Erik Granqvist, Stockholm, Sweden, assignor to Aga-Baltic Aktiebolag, Stockholm, Sweden, a corporation of Sweden Application June 30, 1942, Serial No. 449,118
In Sweden April 2, 1942

9 Claims. (Cl. 250—11)

My invention relates to short wave or ultra short wave radio direction finders.

Direction finding systems may embody either a rotatable frame antenna (or other directional receiving antenna) or a plurality of fixed antennas connected with a goniometer. The use of two or more fixed antennas and a goniometer eliminates the necessity of operating in the immediate vicinity of the antenna, as is the case when using a single rotatable antenna. In direction finding systems using short wave or ultra short wave, however, it is difficult to transfer the oscillations from the receiving antenna to a remote goniometer and the associated amplifiers.

But even when using a rotatable antenna without a goniometer, it may be desirable to locate the amplifier at a distance from the antenna. The same difficulties are then involved in transferring the oscillations.

These difficulties also occur in direction finding systems using frequencies lower than those normally used for short wave or ultra short wave direction finding.

The magnitude of the voltage fed to the first amplifier of the receiver determines the sensitivity of a direction finding system. This voltage should be sufficiently great to obtain a rather good relation between signal intensity and ground noise level. This, however, in previously used systems has been found to be low and in many cases even too low to make good direction finding possible.

The present invention relates to an arrangement for avoiding this disadvantage.

Figure 1:
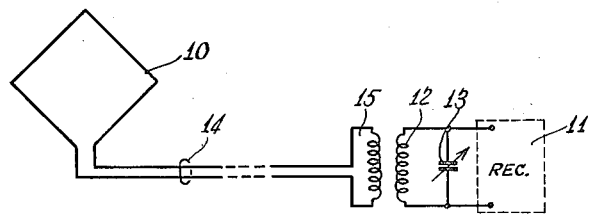
Figure 2:
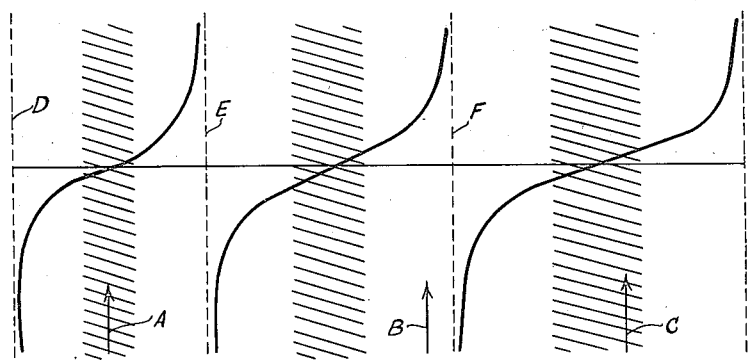
Figure 3:
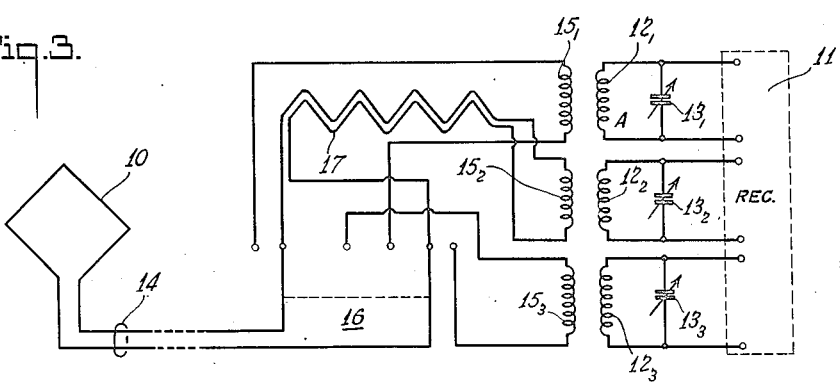
Figure 4:
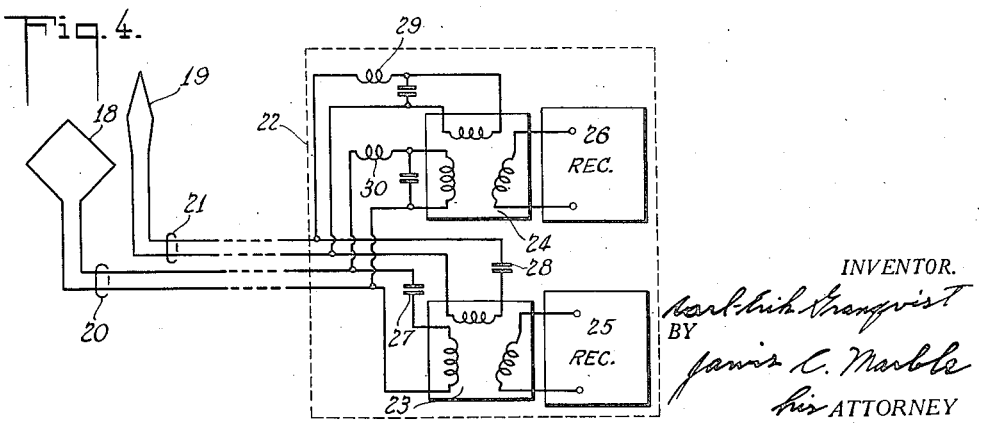

The invention is further described in connection with the annexed drawing, in which Fig. 1 is a diagram showing a standard direction finding system, Fig. 2 in a series of characteristic curves of a direction finding system according to the present invention, and Figs. 3 and 4 are diagrams showing respectively two different embodiments of the invention.

In Fig. 1 a direction finding arrangement is shown comprising a rotatable loop antenna 10 and a receiver 11, the first oscillation circuit of which is indicated in the form of a coil 12 and a condenser 13. The line between the loop antenna and the receiver is indicated at 14. This line is terminated by a coil 15, which is inductively coupled to the coil 12.

The voltage across the circuit 12—13, which is also the input voltage of the amplifier 11, is given by the following formulas:

$$V = E \cdot h_{eff} \cdot \frac{\sqrt{X}}{1+X} \cdot k \sqrt{\frac{L_2}{L_1}} \cdot Q_{2eff}$$

Where

V represents the voltage across the circuit 12—13,
E represents the field intensity at the loop antenna,
$h_{eff}$ represents the effective height of the loop antenna $$= \frac{2\pi F n}{\lambda}$$

$$X = \frac{L'_1}{L_1}$$

$k$ is the coupling coefficient between the coils 15 and 12,
$L_2$ is the inductance of the coil 12,
$L_1$ is the inductance of the loop inclusive of the inductance of the line 14,
$L'_1$ is the inductance of the coil 15, and
$Q_{2eff}$ is the effective quality value (the Q-factor) for the tuning circuit 12—13, taking into consideration the losses introduced by transformation from the loop.

In the formula of $h_{eff}$:

F is the area of the loop,
$n$ is the number of turns in the loop, and
$\lambda$ is the wave length of the received signal.

It may be assumed that the magnitude X in the above formula is a constant. The value of X must not be too great, however, as in such case the effective inductance of the tuning circuit would be too small. This inductance is $$L_{2eff} = L_2 \left(1 - \frac{k^2 X}{1+X}\right) \qquad (1)$$

In practice it is necessary to keep the value of $L_{2eff}$ = about 0.85 to 0.9 $L_2$, thereby making X substantially constant. $L_{2eff}$ may not be increased above the said value because an increase of $L_{2eff}$ presupposes an increase of the number of turns in the secondary winding, which will, however, cause too much increase in the natural capacity of the winding.

In this connection it should be observed that the effective inductance $L_{2eff}$ of the secondary winding of the transformer is not dependent upon the wave length or the frequency. Hence the secondary winding may be tuned with one tuning knob, which may be common for this circuit and for the other tuned circuits of the receiver.

If in the formula for the input voltage V, one assumes X and $L_2$ to be constant, the input voltage will then be dependable upon only two variables, viz. the input field intensity E and a factor $$G = \frac{h_{eff}}{\sqrt{L_1}} \qquad (2)$$

which indicates the quality of the direction finding system.

Hence the loop should be dimensioned in such a way, that it has the greatest possible effective height and the smallest possible inductance.

In attempts to obtain a good quality value G of the direction finding system by using a loop antenna of a very great area, it has not been possible to place the loop antenna sufficiently near the receiver. Hence the line from the loop antenna to the receiver has been lengthened to a corresponding degree. It is, however, evident from the formula of the quality G of the loop system, that lengthening the feeder line with a corresponding increase in the total inductance of the loop and the feeder line will cause a decrease of the quality. Hence for practical reasons, the intended results are not obtained. It is true that in spite of that satisfactory results have been obtained by making the feeder line 14 in the form of special conductors, having small inductance. But this requires thick conductors, screening of the line, etc., which makes the system expensive and complicated. Furthermore the line 14 between the loop and the first tuning circuit may include such capacities that resonance occurs at or near the natural frequency of the loop circuit which may influence the effective conductance of the secondary circuit. In order to prevent this change from interfering with uni-control of the receiver it may be necessary to choose such a low value of the factor X that the efficiency is further decreased.

Finally it has been proposed to avoid the last named disadvantages by connecting a series condenser in the loop to obtain a low reactance in the loop circuit at the resonant frequency. A high amplification has thus been obtained, but this high amplification is limited to a very small frequency range at about the resonant frequency. At frequencies beyond this frequency range, the above mentioned disadvantage continued.

A calculation of the total impedance of the loop 10 and the line 14 at the terminals of the coil 15 shows, that this impedance is $$Z = Z_0 \frac{\frac{j\omega L_1}{Z_0} + j \tan \alpha x}{1 - \frac{\omega L_1}{Z_0} \tan \alpha x} \quad (3)$$

Where
$Z_0$ is the characteristic impedance of the line,
$\omega$ is the angular frequency of the signal,
$x$ is the length of the line, and
$\alpha$ is the electric angle per unit length of the line.

From the indication $j$ of the imaginary unit vector, occurring in the numerator, it is evident that the impedance has the character of an inductance. When graphically investigating the formula of this inductance, it is found that it very closely approximates the form of a group of tangents, as indicated in Fig. 2 of the drawing. In this figure the value Z according to the above formula is plotted along the vertical axis, and the angular frequency is plotted along the horizontal axis.

The first section of the curve of Fig. 2 takes a form which is somewhat different from the form of the remaining sections, as the impedance at the frequency zero is $=0$. The curve, therefore, tangentially leaves the axis of the zero impedance value, and approaches the first vertical assymptotic line of the type D, E, F in Fig. 2 almost assymptotically. This is important, because in long wave direction finding one usually works on a part of said first branch of the impedance curve in which the impedance is very low.

It is thus evident from Fig. 2, that the inductance of the line is 0 or approximately 0 at a great many frequencies. The explanation to this is found in the fact, that the line will function as a band pass filter having a large number or possibly an indefinite number of sections.

According to the invention the length of the line must be such, that it, together with the antenna, functions as a band pass filter for the received frequency, the total inductance of the line and the loop antenna being 0 or approximately 0. In Fig. 2 a number of bands, which may be received by means of a line which is dimensioned in this manner are indicated by shade lines.

By practical trials it has been found that the limits of these bands correspond to $\pm 10\%$ change of the effective inductance $L_{2eff}$ of the tuning circuit, as beyond these band limits the absolute value of the inductance of the line and the antenna becomes too high and moreover the frequency displacement in the first tuning circuit becomes too great, these two circumstances contributing to make good reception impossible.

It is possible to receive a plurality of short wave signals in different limited bands by means of the same antenna. As a rule one cannot depend upon all of these short wave signals falling within any of the bands in question. It is for instance possible that three short wave signals may be situated as indicated by the arrows A, B and C in Fig. 2. In the chosen example it is obvious that the signals A and C may be received without difficulty, whereas the signal B falls within a range where the signal wave is not transferred by the antenna system because the line 14 will have too great inductance. In such a case, the length of the line 14 should be changed simultaneously with the switching of the receiver for another wave length range. Preferably the line 14 is lengthened by an amount to displace the wave length ranges in Fig. 2 so that the signal B will fall at or near the middle of one of the receivable frequency ranges.

The arrangement is schematically shown in Fig. 3 which indicates the loop antenna 10 and the line 14 in the same manner as in Fig. 1. There are, however, three coils $15_1$, $15_2$ and $15_3$ and also three different circuits, 12, 13, indicated by the same indices. These circuits are intended for reception of the signals A, B and C, and they are therefore tunable by means of their condensers 13 to a wave length band on each side of these three signals.

The switching may take place by means of a switch 16 having three different positions, whereby the line 14 is connected selectively to each of the three secondary coils 15. When connecting the line 14 to the secondary coil $15_2$ a suitable length of cable 17 is included, said cable preferably being of the same kind as the line 14 in order that reflection may be avoided. The length of the cable 17 is such that the line 14 in combination with the cable 17, functions as a filter having a very great number or an indefinite number of sections, the impedance of which is 0 or approximately 0 for signals with the frequency B.

By this arrangement it is possible to transfer signals of all three frequencies, A, B, and C, from the loop antenna to the receiver with sufficient signal intensity.

Of course, it would be possible to use a corresponding band filter instead of the cable-length 17.

By means of the formula for the impedance of the line the midfrequency of the band which may be transferred by the line can be easily calculated. The impedance becomes 0 when the numerator in the expression is 0, that is when $$\frac{\omega L_1}{Z_0} = -\tan \alpha x \quad (4)$$

In a corresponding way the impedance becomes infinite at frequencies such that the denominator is made $=0$ $$\frac{\omega L_1}{Z_0} \cdot \tan \alpha \cdot x = 1 \quad (5)$$

From the formula as well as from Fig. 2, which graphically indicates the formula, it is evident that the variation of the impedance within the range in which reception of the signal is possible, is practically linear with the frequency. The inductance represented by the impedance will therefore vary approximately as the impedance of a physical inductance. Therefore, the line will follow the same laws as a physical inductance with respect to its frequency influence on the tuned circuit, which means that when choosing the coupling factor as well as the factor X, no frequency displacement of the tuned circuit will take place and uni-control therefore remains possible.

However, the curves are bent, and at greater deviations from the midfrequencies one will therefore obtain values of Z which are no longer linearly variable with the frequency. This causes a deviation with respect to the effective inductance $L_{2eff}$ of the secondary circuit, which according to the above indications should not be allowed to exceed 10% of the value of this inductance at the midfrequency of the respective bands.

In a direction finding system of the above described type a fully satisfactory signal intensity can be obtained even if the loop is of substantially smaller area than was hitherto regarded as necessary. Such a smaller loop is suitable also for reception of long wave directional signals. Therefore it will be possible to use the same loop system for direction finding which takes place alternatively on long wave and on short wave. Fig. 4 shows schematically an arrangement for this purpose.

In Fig. 4 there are shown two loop antennas 18 and 19 placed normal to each other, which are connected to the receiver 22 by means of lines 20 and 21, made in accordance with the present invention. This receiver contains two goniometers 23 and 24, connected to the lines 20 and 21 in multiple. Each goniometer may contain two fixed coils and one movable coil. One movable coil is connected to a receiver for short wave direction finding 25 and the other movable coil is connected to a receiver for long wave direction finding 26.

In the parts described above, the system is usable for short wave direction finding as well as for long wave direction finding. This is due to the fact that the lines 20 and 21 do not establish any substantial inductance when used with long waves, as they are short as compared with the wave length. For short wave, however, they are long as compared with the wave length, but in spite of that they do not constitute any high effective inductance, as they are dimensioned in accordance with the present invention.

It is to be noted that the antenna system works, when using long wave, on the first mentioned branch of the curves, but when using short waves it works on one of the branches indicated in Fig. 2, the lines 20, 21 having been dimensioned in such a way that the short wave frequency falls within one of the shaded frequency bands, for example, at the frequency A. The direction finding frequency for long wave may for example be situated within the band 300–600 kcs., whereas the direction finding frequency for short wave may be within the band 2500–4000 kcs.

However, one disadvantage occurs because a mutual reaction may take place between the long wave system and the short wave system, in spite of the lines 20 and 21 for both of these systems being of low ohmic resistance. As a matter of fact errors may occur, especially when direction finding with short waves, and in some cases these errors may amount to the magnitude of 2 or 3 degrees. In order to avoid this reaction between the short wave part and the long wave part of the system, condensers 27, 28 are introduced in the line to the goniometer 23, and filters 29 and 30 are introduced in the line to the goniometer 24, respectively. Each of the filters 29 and 30 contains, as shown in the drawing, a relatively small series inductance coil and a parallel condenser.

Although the invention has been described and shown in connection with certain embodiments thereof, it is obvious that the invention is not limited thereto, but that suitable modifications may be made without departing from the scope of the invention. For example, it is possible to use the arrangement according to Fig. 4 with a switching arrangement as described in Fig. 3.

What is claimed is:

1. A radio direction finding system comprising an antenna, a receiver having tuning circuits and a transmission line connecting said antenna with said receiver tuning circuits characterized in that the inductance of the antenna and the length and the characteristic impedance of said transmission line from the antenna to the tuning circuit of the receiver are so chosen that the equation $$\frac{\omega L_1}{Z_0} = \tan \alpha x$$

is substantially satisfied, $\omega$ indicating the angular frequency of the received signal, $L_1$ indicating the characteristic inductance of the antenna inclusive of the inductance of the transmission line to the first tuning circuit, $Z_0$ indicating the characteristic impedance of the line, $\alpha$ indicating the electric angle per unit of length of the transmission line and $x$ indicating the length of the transmission line.

2. A radio direction finding system according to claim 1, characterized in that the inductance of the antenna and the length and characteristic impedance of the transmission line from the antenna to the tuning circuit of the receiver are so related that the variation of the impedance Z of the transmission line within the frequency band intended for reception does not exceed values corresponding to $\pm 10\%$ variation of the effective inductance ($L_{2eff}$) of said tuning circuit.

3. A radio direction finding system according to claim 1 having a loop antenna and a plurality of receiver tuning circuits suited for different wave length ranges, and having transmission lines of different lengths connected to the respective tuning circuits, the lengths of said lines compensating for the differences in wave lengths to be received by the respective tuning circuits.

4. A radio direction finding system according to claim 1 having a loop antenna and a plurality of receiver tuning circuits suited for different wave length ranges, and having transmission lines of different lengths connected to the respective tuning circuits, the lengths of said lines compensating for the differences in wave lengths to be received by the respective tuning circuits, and switching means connecting said lines respectively to said antenna.

5. A radio direction finding system according to claim 1 having a loop antenna and a plurality of receiver tuning circuits suited for different wave length ranges, and having transmission lines of different lengths connected to the respective tuning circuits, the lengths of said lines compensating for the differences in wave lengths to be received by the respective tuning circuits, one of said lines including a filter suited to pass the selected band.

6. A radio direction finding system according to claim 1 having a plurality of receivers connected to said transmission line, one of said receivers being receptive for short waves and another of said receivers being receptive for long waves.

7. A radio direction finding system according to claim 1 having a plurality of receivers connected to said transmission line, one of said receivers being receptive for short waves and another of said receivers being receptive for long waves, and means in the transmission line to the short wave direction finding receiver and in the transmission line to the long wave direction finding receiver, respectively, to prevent reaction between these receivers.

8. A radio direction finding system according to claim 1 having a plurality of receivers connected to said transmission line, one of said receivers being receptive for short waves and another of said receivers being receptive for long waves, and series condensers connected in the transmission line to the short wave direction finding receiver to prevent reaction between said receivers.

9. A radio direction finding system according to claim 1 having a plurality of receivers connected to said transmission line, one of said receivers being receptive for short waves and another of said receivers being receptive for long waves, and filters containing a series inductance and a short capacity connected in the transmission line to the long wave direction finding receiver to prevent reaction between said receivers.

CARL-ERIK GRANQVIST.